(12) United States Patent
Tsikouras et al.

(10) Patent No.: US 10,483,076 B2
(45) Date of Patent: Nov. 19, 2019

(54) APPARATUS, METHOD AND SYSTEM FOR THE CALIBRATION OF A STREAK CAMERA

(71) Applicant: MCMASTER UNIVERSITY, Hamilton (CA)

(72) Inventors: Anthony Tsikouras, Dundas (CA); Qiyin Fang, Grimsby (CA)

(73) Assignee: MCMASTER UNIVERSITY, Hamiton, Ontario (CA)

( * ) Notice: Subject to any disclaimer, the term of this patent is extended or adjusted under 35 U.S.C. 154(b) by 711 days.

(21) Appl. No.: 14/913,146

(22) PCT Filed: Aug. 7, 2014

(86) PCT No.: PCT/CA2014/050743
§ 371 (c)(1),
(2) Date: Feb. 19, 2016

(87) PCT Pub. No.: WO2015/024112
PCT Pub. Date: Feb. 26, 2015

(65) Prior Publication Data
US 2016/0211108 A1 Jul. 21, 2016

Related U.S. Application Data

(60) Provisional application No. 61/868,363, filed on Aug. 21, 2013.

(51) Int. Cl.
*H01J 31/50* (2006.01)
*G02B 6/04* (2006.01)
*G03B 39/00* (2006.01)

(52) U.S. Cl.
CPC .............. *H01J 31/501* (2013.01); *G02B 6/04* (2013.01); *G03B 39/005* (2013.01); *H01J 31/502* (2013.01)

(58) Field of Classification Search
CPC ........ H01J 31/501; H01J 31/502; G02B 6/04; G03B 39/005
See application file for complete search history.

(56) References Cited

U.S. PATENT DOCUMENTS

| 4,375,037 A | * | 2/1983 | Ikushima | ............. H04B 10/695 327/166 |
| 4,435,727 A | | 3/1984 | Schiller et al. | |

(Continued)

FOREIGN PATENT DOCUMENTS

EP 0478458 4/1992

OTHER PUBLICATIONS

International Search Report in PCT/CA2014/050743 dated Dec. 15, 2014.

(Continued)

*Primary Examiner* — Kevin K Pyo
*Assistant Examiner* — Don Williams
(74) *Attorney, Agent, or Firm* — Hill & Schumacher

(57) ABSTRACT

The present disclosure claims an apparatus, a method and a system for the calibration of a streak camera. A plurality of fiber optic cables is bundled together such that the input ends and the output ends of the fibers are grouped together. Each fiber in the bundle has a distinct and characteristic time taken for light to traverse from the input end to the output end known by the observer. This characteristic time depends on the physical and optical properties of the fibers selected. Calibration light is collected by the fiber input face and travels through the individual fibers in a characteristic time. Individual light pulses will subsequently be detected by the streak camera which converts the time profile of the incoming light pulses into a spatial profile. An observer can compare the observed spatial separation profile to an expected spatial separation profile for calibration.

15 Claims, 3 Drawing Sheets

(56) References Cited

U.S. PATENT DOCUMENTS

| | | | | |
|---|---|---|---|---|
| 4,712,001 | A | * 12/1987 | d'Humieres | G01R 13/347 250/214 VT |
| 6,642,499 | B1 | 11/2003 | Boni et al. | |
| 2004/0264771 | A1 | * 12/2004 | Sharma | H04N 1/603 382/165 |
| 2005/0123303 | A1 | * 6/2005 | Guttman | B41J 2/46 398/142 |
| 2012/0224806 | A1 | * 9/2012 | Lu | G01N 21/45 385/28 |

OTHER PUBLICATIONS

Written Opinion in PCT/CA2014/050743 dated Dec. 15, 2014.
Terence J. Davies, "Technique for Optically Calibrating Streak Cameras", The Review of Scientific Instruments, vol. 41, No. 7, Jul. 1970, pp. 920-922.
Perry Bell et al., "Compact Optical Technique for Streak Camera Calibration", Review of Scientific Instruments, vol. 75, No. 10, Oct. 2004, pp. 3930-3933.

\* cited by examiner

APPARATUS, METHOD AND SYSTEM FOR THE CALIBRATION OF A STREAK CAMERA

CROSS-REFERENCE TO RELATED APPLICATIONS

This application is a National Phase application claiming the benefit of PCT/CA2014/050743 filed on Aug.7, 2014, in English, titled "APPARATUS, METHOD AND SYSTEM FOR THE CALIBRATION OF A STREAK CAMERA", which further claims priority to U.S. Provisional Patent Application No. 61/868,363 filed on Aug.21, 2013, the entire contents of which are incorporated herein by reference.

FIELD OF THE INVENTION

The present disclosure relates to an apparatus, method and system for the calibration of streak cameras.

BACKGROUND

The streak camera is a high speed time measurement instrument with resolution in the picoseconds to femtoseconds. At a streak camera's entrance slit, incident photons are used to generate electrons that are accelerated through the streak tube towards a phosphor screen. The electrons' trajectories are deflected by a time-varying electric field (sweeping voltage) applied perpendicular to the direction of travel (as shown in FIG. 1). As a result, the deflection distance of photoelectrons on the phosphor screen is correlated to the time they arrive at the photocathode.

The sweep voltage of a streak camera can take the form of a ramp voltage. In many cases, the ramp voltage is not linear (e.g. using the rising or falling edge of a sinusoidal wave) so the accuracy of the temporal measurement of a streak camera relies on careful calibration of the nonlinearity of the shape of the sinusoidal voltage.

The precision of the temporal measurement in a streak camera depends on the stability of the sweeping voltage. Typical sources of error arise from 1) amplitude variation (vertical axis in FIG. 2); and 2) phase variation (horizontal variation in FIG. 2). Current calibration techniques are expensive, ineffective at the extremes of the sweep range, and require repetitive calibration between observations. A more economical and effective solution to both issues of amplitude and phase variation would provide a more viable and reliable streak camera.

SUMMARY

An embodiment of the present disclosure relates to the economic and effective calibration of streak cameras. More specifically, streak cameras use varying electric field generators which oscillate at very high frequencies and aim to record observations over very short and specific time spans. As a result, a high degree of precise calibration is necessary.

The present disclosure discloses an apparatus, a method and a system for the calibration of a streak camera. A plurality of fiber optic cables are bundled together as shown in FIG. 3 such that the input ends and the output ends of the fibers are grouped together. The output face of the fiber bundle is oriented towards the streak cameras observation lens and the input face is oriented away from the device such that it can receive a fraction of the calibration light.

Each fiber in the bundle has a distinct and characteristic time taken for light to traverse from the input end to the output end known by the observer. This characteristic time depends on the length of the fiber, the size of the fiber, and the index of refraction of the medium, in this case the material used to make the fiber, such that the times may be varied by altering the length and the material used in order to produce a desired variety of output times across the plurality of fibers.

The calibration light is collected by the fiber input face and travels through the individual fibers. Light pulses will be emitted from the output face at characteristic times following the desired time profile. The individual light pulses will subsequently be detected by the streak camera and the ejected electrons will be deflected by differing amounts as a result of the varying electric field essentially converting the time parameters of in the incoming light pulses into spatial parameters. An observer can compare the observed spatial separation profile of the light pulses to expected spatial separation profile in order to accurately calibrate for phase variations, amplitude variations, and drift.

An embodiment of an apparatus for calibration of a streak camera comprises:
  a fiber bundle, comprising
    a plurality of fibers having an input and an output,
      the plurality of fibers being made of a material selected on a basis of supporting fiber-optic transmission,
    wherein the plurality of fibers comprises at least a first fiber and a second fiber,
    wherein a light travel time is defined as the time taken for light to travel from the input to the output of the fiber, and
    wherein at least one time difference between light travel times is known.

Another embodiment provides a method for calibrating a streak camera comprising:
  assembling a fiber bundle comprising a plurality of fibers wherein one end is designated as an input and one end is designated as an output;
  forming the plurality of fibers from a material selected on a basis of supporting fibre-optic transmission; and
  receiving a light pulse into the input of at least two of the plurality of fibers, wherein the light pulse traveling through a first fiber exits the output at a first time and the light pulse traveling through a second fiber exits the output at a second time, and wherein a time difference between said first time and said second time is known.

Another embodiment provides a system for calibration of a streak camera comprising:
  a fiber bundle, comprising
    a plurality of fibers having an input and an output,
      the plurality of fibers being made of a material selected on a basis of supporting fibre-optic transmission,
    wherein the plurality of fibers comprises at least a first fiber and a second fiber,
    wherein a light travel time is defined as the time taken for light to travel from the input to the output of the fiber, and
    wherein at least one time difference between light travel times is known.

A further understanding of the functional and advantageous aspects of the invention can be realized by reference to the following detailed description and drawings.

BRIEF DESCRIPTION OF THE DRAWINGS

Embodiments will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

Figure 1:
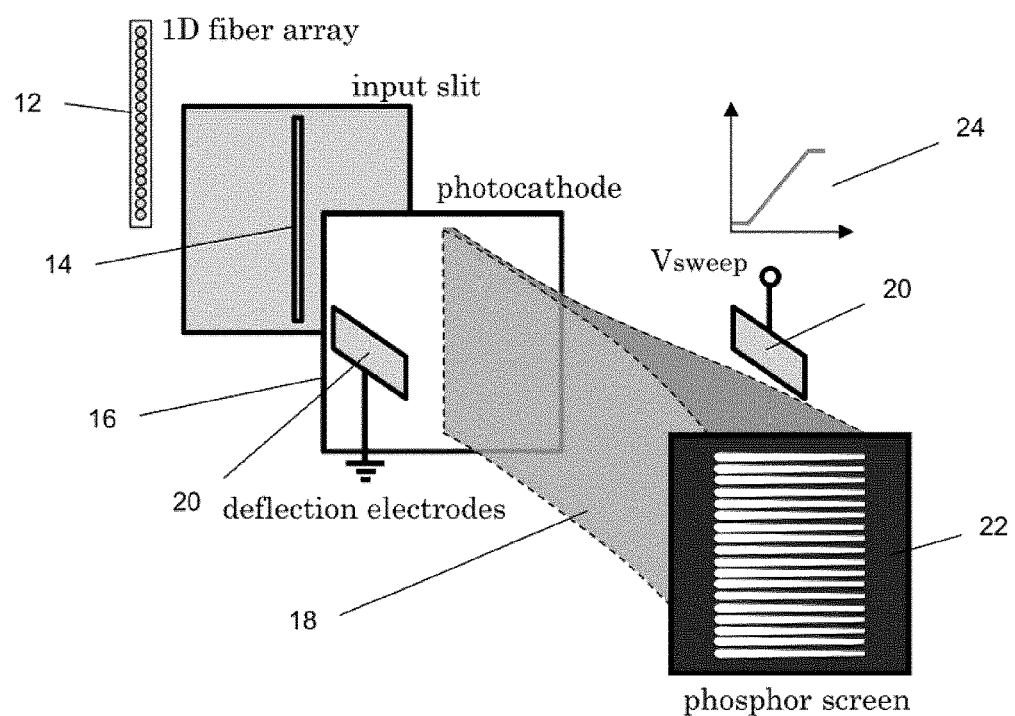
FIG. 1 shows the basic operating principle of a streak camera.

FIG. 1 depicts a common embodiment of a modern streak camera. The 1D fiber array 12 provides a one (1) dimensional source of observable light. The camera is positioned such that light emitted by the fiber array is isolated through the input slit 14 of the streak camera. The light pulses interact with a photocathode 16 such that electrons are ejected from the interaction sites of the photons and the photocathode towards the capture screen 22. In a preferred embodiment, the screen is a phosphor screen for electron absorption. Before being absorbed at the capture screen 22, electrons interact with a deflection region and are deflected by a time varying potential created and varied by the potential manipulating devices 20. In a preferred embodiment, the sweep voltage 24 controlled by the potential manipulating devices 20, is linearly changing. However, in practice, a sinusoidal varying potential is more common.

Figure 2:
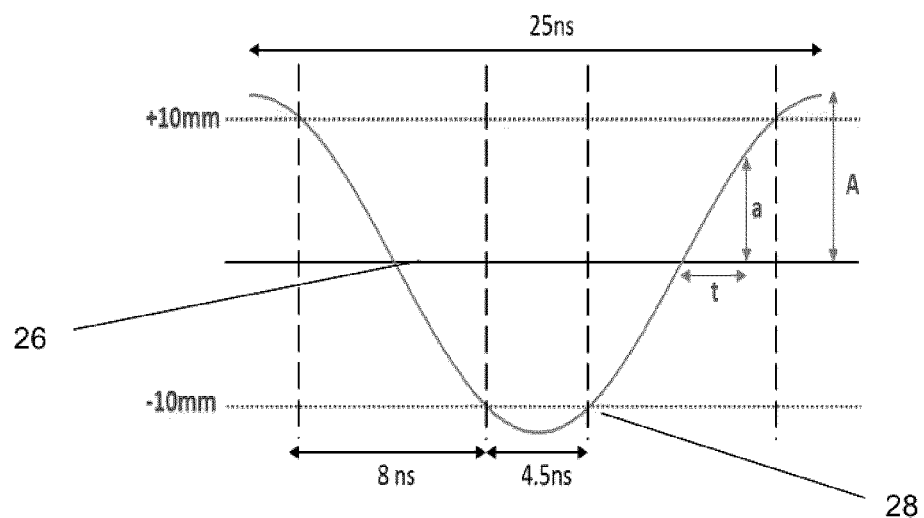
FIG. 2 shows a sinusoidal sweeping scheme at a 40 MHz repetition rate.

FIG. 2 depicts the deflection ranges of electrons deflected at different times relating to the sinusoidal sweep voltage. Although a linear regression would model a sine wave very well near the center of the period 26 (i.e. the average voltage) the loss of accuracy falls off dramatically near the edges 28 (i.e. the maximum and minimum voltages).

In many applications (e.g. fluorescence lifetime), the system's temporal response which includes the laser excitation pulse width and the stretching of the pulse by the optical system is not negligible and it would be useful to have this accounted for. The present design allows the measure of the system input response, which is particularly useful in deconvolution of fluorescence lifetime in which the excitation laser pulse is measured directly, and simultaneously for each fluorescence decay. In most applications, the system response is measured using the same setup but only before or after the fluorescence decay, not at the same time. The advantages of simultaneous system response measurement is to account for potential pulse to pulse variability (e.g. from the excitation laser and the measurement system).

TABLE 1

| Screen Size/ Sweep Range | Sweep voltage crossing time (ns) | Sweep Rate (ps/mm) | | Linearity (center rate/ edge rate) |
| --- | --- | --- | --- | --- |
| | | Center of screen | Edge of screen | |
| 6.1% | 0.5 | 25.00 | 25.04 | 99.8% |
| 12.3% | 1.0 | 50.00 | 50.38 | 99.2% |
| 24.5% | 2.0 | 100.0 | 103.2 | 96.9% |
| 49.0% | 4.1 | 200.0 | 229.5 | 87.1% |
| 98.1% | 10.9 | 400.0 | 2061 | 19.4% |

Table 1 shows the sweep voltage crossing time and time-scale linearity for various screen size to sweep range ratios, given a sweep frequency of 40 MHz. The sweep rate is calculated based on a screen size of 19.5 mm. These settings are representative of the modes available to the Optronis SC10 streak camera, though the 400.0 ps/mm setting is a custom option.

The sweep voltage of the streak camera, operating at 40 MHz at a high voltage, is difficult to keep stable. The amplitude of the sweep voltage typically requires 2 hours to stabilize to the proper value. Also, the phase difference between the input trigger to the sweep unit and the sweep voltage drifts over time as the streak camera is running.

As a result of the sweep voltage amplitude drift, it is insufficient in practice to rely on expected values of the sweep voltage amplitude. Furthermore, to prevent the fluorescence decays from drifting off-screen over time due to the continuous phase delay, a real-time correction to the phase delay must be applied.

A solution to both these problems is proposed by the present disclosure. In an embodiment of the disclosure, reference fibers of known varying lengths are bundled together. Calibration light is collected at the input end of these fibers and is transmitted out the output end of the bundle. Light pulses will exit the output at known times related to the time taken for the light to propagate through each one of the fibers in the fiber bundle. These signals are then processed through the streak camera's varying potential field, effectively converting their separation from a temporal dimension to a spatial dimension based on the changing electron deflection angles. The spatial profile of the observed calibration light pulses is compared to a known calibration profile in order to correct for unwanted drift, amplitude variation and phase variation. One advantage of this design is that calibration is be done at the same time as each observation is made and can accounts for (and correct) variations between each observation.

The time taken T for light to traverse an entire fiber follows the optics equation (1):

$$T = \frac{c}{n} * l \qquad (1)$$

where c is the speed of light in a vacuum, n is the index of refraction of the medium (in this case the material used as a fiber) and l is the length of the fiber.

Figure 3:
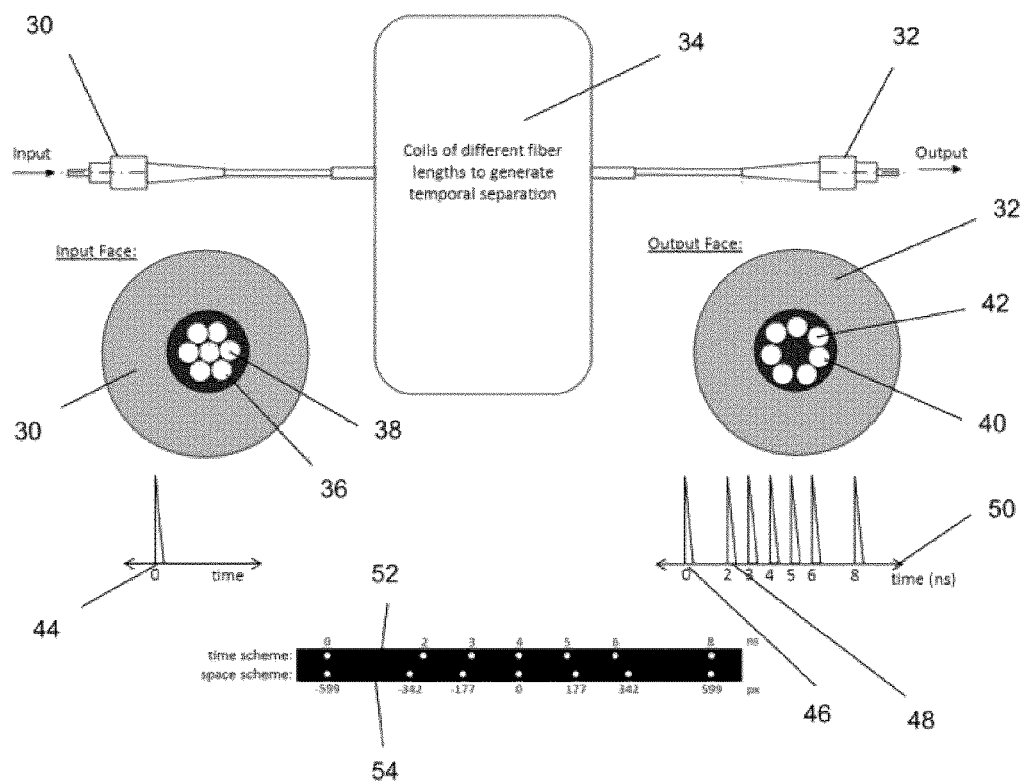
FIG. 3 shows a reference fiber bundle design.

An embodiment of the present disclosure comprises a fiber bundle wherein seven fibers of different lengths are used to generate different arrival times at the streak camera. The fibers are illuminated by back reflected excitation light, are free-space coupled into a single fiber, and then connected into the streak camera's reference port. As a result, at the top of the streak camera readout, a constant pattern of 7 spots appears of known separation in time. This scheme is shown in FIG. 3. It is noted that the fibers in the bundle may be either single and multi-mode, however, practically, it is much easier to use multi-mode fibers.

Specifically, FIG. 3 shows a reference fiber bundle design for a streak camera produced in accordance with the present disclosure. Seven fibers collect back reflected excitation light at the input end 30. Each fiber has a known different length, to generate separation in the arrival time of each channel at the output end 32. For example, a first fiber 36 and a second fiber 38 simultaneously collect light at the input face 30. The second fiber 38 has a known difference in length from the first fiber 36. The fibers are bundled together in the fiber bundle 34. Light propagates through both fibers and are emitted from the output face 32. The output is free-space coupled into a single fiber, and connected to the reference port of the streak camera. The input laser pulse is shown on a time scale 44 representing the unity of input light. The output laser pulse profile is shown on a time scale 50 representing the separation of time between output pulses traveling through different fibers. Following the above mentioned example, the pulse exiting the first fiber 46 and the pulse exiting the second fiber 48 are shown on the output time scale 50. The separation in time 52 is converted to a separation in space 54 by the streak camera, resulting in the space scheme at the bottom of the figure.

Another embodiment of the present disclosure comprises a plurality of fibers of identical length in a fiber bundle. Each fiber's material is selected such that a desired light output time profile is produced. This is achieved by selecting materials with incrementally increasing indices of refraction.

A more general embodiment of the present disclosure comprises varying the lengths and the materials used in the fibers to produce a desired output profile.

It is favorable for the abovementioned embodiment to have output fibers evenly positioned about a circle as shown in FIG. 3 at a constant radial distance from the center of the output face such that light intensity from surrounding fibers is evenly distributed.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. An apparatus integrated into a streak camera for real-time calibration of a streak camera during acquisition of each streak camera observation, comprising:
    a fiber bundle, comprising
        a plurality of fibers having an input face and an output face,
        the plurality of fibers being made of a material selected on a basis of supporting fiber-optic transmission,
    wherein the plurality of fibers comprises at least a first fiber and a second fiber,
    wherein a light travel time is defined as the time taken for light to travel from the input face to the output face of the fiber,
    wherein at least one time difference between light travel times is known; and
    wherein after acquisition of each streak camera observation, processing light signals emitted from said output face of said fibers through the streak camera's varying electric field to convert the light signals' temporal profile to a spatial profile, comparing the spatial profile, acquired at the same time as the streak camera observation, to a known calibration profile in order to correct for unwanted drift, amplitude variation and phase variation for each streak camera observation.

2. The apparatus as claimed in claim 1, wherein the first fiber has a different length than the other fibers and the time difference is related to a difference of lengths between the first fiber and the other fibers.

3. The apparatus as claimed in claim 1, wherein the first fiber has at least one of a difference of index of refraction and a difference in optical properties than the other fibers; and
    wherein the time difference is related to a difference between velocities of light through the first fiber and the second fiber.

4. The apparatus as claimed in claim 1 wherein the fibers at the output face are evenly positioned about a circle with a chosen radial distance from a center of the output face.

5. A method for real-time calibration of a streak camera during acquisition of each streak camera observation, comprising:
    assembling a fiber bundle comprising a plurality of fibers wherein one end is designated as an input face and one end is designated as an output face;
    forming the plurality of fibers from a material selected on a basis of supporting fiber-optic transmission; and
    during acquisition of each streak camera observation, receiving light signals into the input face of at least two of the plurality of fibers, wherein the light signals traveling through a first fiber exits the output face at a first time and the signals traveling through a second fiber exits the output at a second time, and wherein a time difference between said first time and said second time is known; and
    after acquisition of each streak camera observation, processing light signals emitted from said output face of said fibers through the streak camera's varying electric field to convert the light signals' temporal profile to a spatial profile, comparing the spatial profile, acquired at the same time as the streak camera observation, to a known calibration profile in order to correct for unwanted drift, amplitude variation and phase variation for each streak camera observation.

6. The method as claimed in claim 5, wherein the first fiber has a different length than the second fiber.

7. The method as claimed in claim 6, wherein the time difference is related to a difference of lengths between the first fiber and the second fiber.

8. The method as claimed in claim 5, wherein the first fiber has at least one of a difference of index of refraction and a difference in optical properties than the second fiber.

9. The method as claimed in claim 8, wherein the time difference is related to a velocity difference between velocities of light through the first fiber and the second fiber.

10. The method as claimed in claim 5, wherein the input face is positioned to receive back reflected excitation light.

11. The method as claimed in claim 5, wherein the output face is positioned to output light into the streak camera for calibration.

12. The method as claimed in claim 11, wherein a plurality of output signals exiting the output face at known times are converted by the streak camera from a time separation profile to a space separation profile characterized by the changing electric field produced by the streak camera.

13. The method as claimed in claim 12, wherein the space separation profile can be compared to an expected space separation profile based on characteristics of the fiber bundle in order to correct for one or more of phase variation error, amplitude variation error and potential drift.

14. The method as claimed in claim 13, wherein the fiber bundle comprises seven fibers and wherein a comparison between the space separation profile produced by the streak camera and the expected space separation profile can be used to calibrate for phase variation error and amplitude variation error in a single observation.

15. The method as claimed in claim 5 wherein the fibers at the output are evenly positioned about a circle with a chosen radial distance from the center of the output face.

* * * * *